(No Model.)
FRANK DELLA TORRE.
METHOD OF NAVIGATING IN FOGGY WEATHER.
No. 350,608. Patented Oct. 12, 1886.
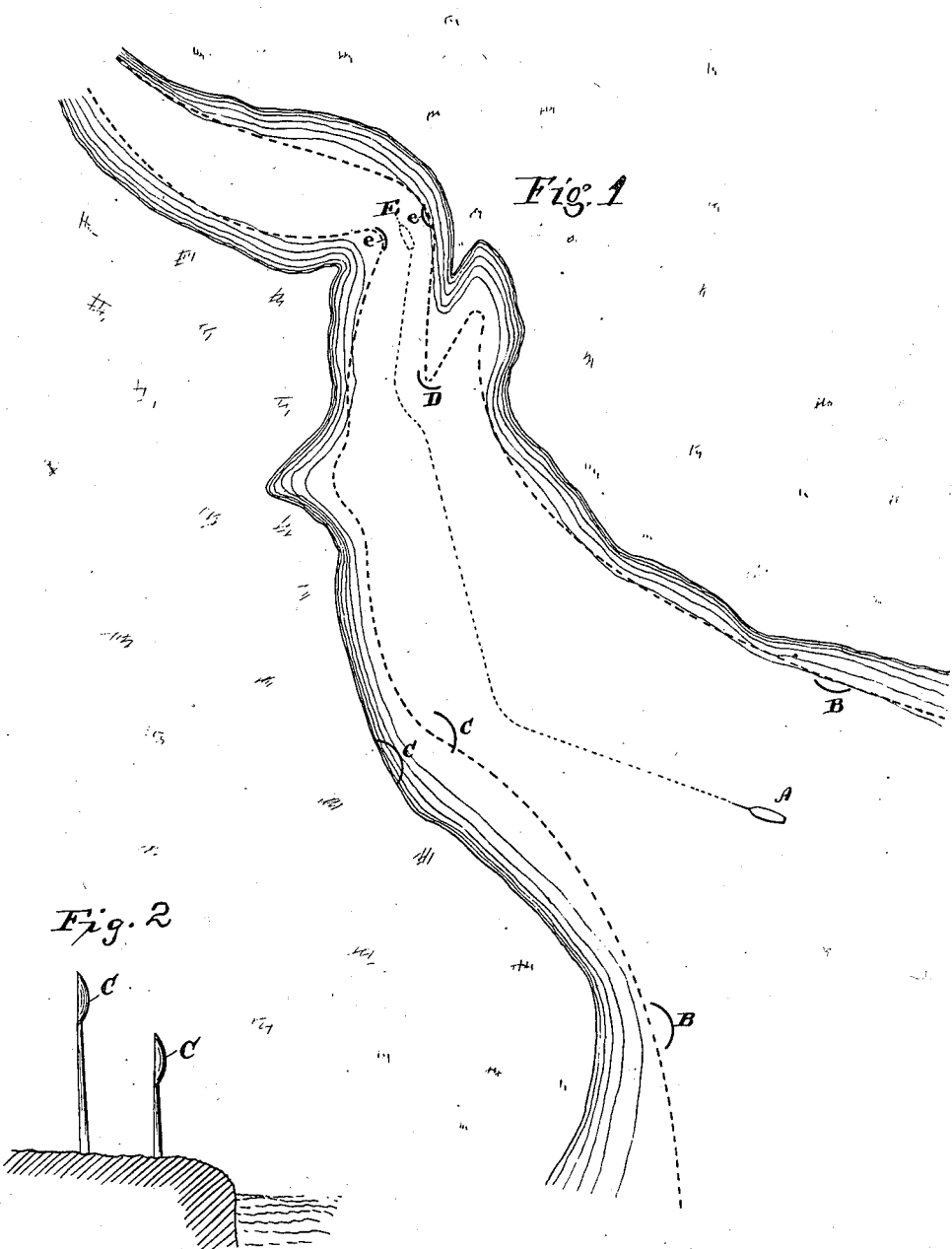

UNITED STATES PATENT OFFICE.

FRANK DELLA TORRE, OF BALTIMORE, MARYLAND.

METHOD OF NAVIGATING IN FOGGY WEATHER.

SPECIFICATION forming part of Letters Patent No. 350,608, dated October 12, 1886.

Application filed December 4, 1885. Serial No. 184,682. (No model.)

*To all whom it may concern:*

Be it known that I, FRANK DELLA TORRE, of Baltimore, in the State of Maryland, have invented certain new and useful Improvements in the Method of Navigating Vessels in Foggy Weather; and I do hereby declare the following to be a full, clear, and exact description of the same, reference being had to the accompanying drawings, forming a part of this specification, and to the figures and letters of reference marked thereon.

Attempts have heretofore been made and various expedients have been resorted to in the endeavor to devise a method or system whereby the dangers attending the navigation of shallow coast or inland waters during the prevalence of a fog or at night, in the absence of fixed lights or other visual signals, could be avoided or lessened in a material degree. No competent means have heretofore been devised for accomplishing this very desirable result, and it is still found desirable, if not absolutely necessary, on the score of safety to both life and property, to practically suspend navigation during the prevalence of fog.

My present invention has for its object to provide a practicable method or system for navigating vessels in foggy weather with comparative safety, and it is based upon the discovery and application of a novel method of utilizing reflected sound signals or echoes for determining the position of a vessel and the course to be pursued in cases where visual signals of all kinds would be unavailable for the purpose.

As heretofore stated, and as will presently be explained, the invention comprehends the novel method whereby this result is produced or brought about, and the accompanying drawings are merely designed as an aid in illustrating the principle of said invention, Fig. 1 representing a diagrammatic view of a portion of a harbor or river with signal or indication stations.

As preliminary to the practicing of my invention, and as auxiliary thereto, it is necessary to provide, construct, or furnish the following instrumentalities: first, a chart of the locality, such as is usually employed by navigators; second, the location at intervals upon or about prominent points, suitably indicated upon the chart, of a series of sound-reflectors or echo-producing media, each having some characteristic feature whereby it can be distinguished from others, as by the number, direction, or intervals of the echoes produced, or by its association with other echo-producing bodies; and, third, a sound-producing medium, a compass, and an observer located upon the vessel, such an arrangement as is described in my Patent No. 299,968, dated June 10, 1884, being well adapted for use in carrying out this part of the method. In said Patent No. 299,968 I have set forth and described a method for ascertaining the presence and determining the location and distance of any obstacle or obstruction upon the water, and said method I propose to utilize in carrying out my present invention, which, as before stated, is based upon my discoveries relative to the availability of the echo as a signaling medium for this purpose. Having established a complete series of echo-producing stations along the course to be traversed, (and each of said stations may be composed of one or more reflecting surfaces or bodies, each occupying a special and predetermined relation to the other and to that part of the channel nearest to them, so that the observer can discriminate between the echoes produced at different points, and thereby locate the particular station from whence the echo or reflected sound is heard,) and having indicated their position upon the chart, so that the navigator will be enabled to locate each station by the echo, the person occupying the position of observer operates the signaling apparatus—such as a whistle, bell, or equivalent sound-producing device—located upon the vessel, and if the latter is in proximity to land or a dangerous point in the course the sound will be reflected and an echo produced by the signal device located at or in the vicinity of the obstruction, and by observing the characteristics of the echo he will be enabled to ascertain by reference to his chart which station he is approaching, and by the aid of the compass he can determine not only his position upon the chart, but the proper course to pursue to avoid the obstacle.

By pursuing this method the course to be traversed can be accurately traced during the prevalence of a fog so dense as to obscure all visual signals, and the navigation of bays, rivers, &c., can be continued in safety, where otherwise it would be attended with great difficulty and danger.

The means which may be adopted for identifying the several stations are numerous and obvious. Thus the direction from where the echo proceeds, its repetition at given intervals and from divers directions may all be produced by the arrangement, location, and relative position of the reflectors employed, and the latter may, if desired, be located on land or anchored in position above the surface of the water, or even attached to the buoys usually employed for visual signals. The variety of characteristic echo-signals that may thus be produced by well-known means and by combinations of echos are very numerous. For instance, a device such as shown in Fig. 2 might be employed, consisting of two reflecting surfaces, $c$ $c$, one slightly above and back of the other, in which case the echo received will consist of two short sharp sounds; or any other suitable devices may be employed—such as will occur to those skilled in the art—for giving a characteristic echo.

In the accompanying drawings the full lines, Figure 1, represent the shore of a bay or banks of a river, and the dotted lines the channel. Fig. 2 shows a device for producing a characteristic echo, used to distinguish the particular reflecting device.

A designates a vessel approaching the bay, and B reflectors located—one on each side—at the entrance and at a considerable distance apart, so that the navigator, sailing by compass, will be able to ascertain from the direction of the echo to which side the channel or entrance lies.

C designates the second echo station furnished with two reflectors, the one located some distance in rear of the other and in position to create a double echo. As the vessel approaches and passes the first station, B, the navigator determines his course by the compass, and proceeding until the double echo of station C is observed he approaches the last-named station to within a given or determinate distance, (which latter is ascertained by the direction of the sound received and the length of time elapsing before the echo is received,) when the course of the vessel is again changed and pursued until the echo from station D is observed, thereby establishing another point, and so on throughout the whole course. Where the channel is particularly tortuous or narrow, as at E in the drawings, it is desirable that a signal-station should be provided of such character as to enable the navigator to readily ascertain the center of the channel; and this is accomplished by locating a reflector, $e$, on each side and at or about equal distances from the center of the channel. Upon approaching and passing such a station, if the vessel pursues the proper course, which will carry it through the center of the channel, a single echo will be observed; but should the vessel be carried out of its course and to the right or left of the channel a double echo will be observed, the first proceeding from the nearer reflector and the second from the more remote. From the signals thus produced the navigator is not only warned of his dangerous position, but is provided with the means whereby to correct his course, as by steering in the direction of the second echo and away from the first until the two echoes are merged and produce an impression as of a single echo, which point will be reached when the reflectors are equidistant from the vessel, thus bringing the latter in the channel. A signal system such as this can be utilized with good effect for navigating narrow or tortuous channels both in clear weather and in the day-time as well as during a fog, for by its use, either alone or in connection with visible objects, the vessel can be guided through the center of the channel and any departure quickly and accurately noted and as readily corrected.

The distance intervening between the vessel and any reflector or echo-signal station can readily be ascertained by the application of well-known rules for determining the rate of sound-transmission.

Having thus described my invention, what I claim as new is—

1. The herein-described improved method for facilitating the navigation of shallow coast or inland waters at night or during a fog, which consists in, first, establishing a series of sound-reflecting and signal stations at predetermined points; second, locating their position upon a chart of the particular locality; and, third, causing a sound-producing device to be operated upon the vessel in a manner to produce an echo or series of echoes by reflection from the signal-stations, whereby the observer is enabled to ascertain his proximity to any given signal-station, and by reference to the chart can determine his position and proper course to be sailed.

2. The herein-described method of navigating narrow or tortuous channels, which consists in locating sound-reflectors upon opposite sides and equidistant from the center of the channel, operating a sound-producer upon the vessel and determining the course to be sailed by reference to the successive echoes as observed upon the said vessel and produced by the said reflectors, as set forth.

3. As an improvement in the art of navigating shallow coast or inland waters, the employment of a series of sound-reflectors or echo-signal stations located at predetermined intervals, and a sound-producer upon the vessel, and ascertaining the position of said vessel with respect to said station or stations through the medium of the echo-signals so produced, as and for the purpose set forth.

4. In a system for navigating shallow coast or inland waters, the employment of a series of stations composed of sound-reflectors located at predetermined points for producing echo-signals, each of said stations being adapted to produce a characteristic echo-signal, whereby each station can be located by means of its echo as received upon a passing vessel, substantially as described.

FRANK DELLA TORRE.

Witnesses:
A. S. STEUART,
THOMAS DURANT.